(12) United States Patent
Kuroda

(10) Patent No.: US 6,594,155 B2
(45) Date of Patent: Jul. 15, 2003

(54) MOUNTING STRUCTURE OF ELECTRONIC PARTS

(75) Inventor: Mitsuru Kuroda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/068,946

(22) Filed: Feb. 8, 2002

(65) Prior Publication Data

US 2002/0135992 A1 Sep. 26, 2002

(30) Foreign Application Priority Data

Mar. 21, 2001 (JP) ........................................ 2001-081270

(51) Int. Cl.[7] ................................................. H05K 7/02
(52) U.S. Cl. .................... 361/807; 361/809; 174/138 G
(58) Field of Search ................................. 361/807–810, 361/799; 174/138 G, 138 F, 151

(56) References Cited

U.S. PATENT DOCUMENTS

| | | | | |
|---|---|---|---|---|
| 4,942,497 A | * | 7/1990 | Mine et al. | 165/185 |
| 5,463,528 A | * | 10/1995 | Umezawa | 165/80.4 |
| 5,836,790 A | | 11/1998 | Barnett | |
| 5,937,361 A | | 8/1999 | Smith | |
| 5,999,407 A | * | 12/1999 | Meschter et al. | 165/185 |
| 6,151,215 A | * | 11/2000 | Hoffman | 165/104.33 |
| 6,304,440 B1 | * | 10/2001 | Lin | 361/685 |
| 6,304,450 B1 | * | 10/2001 | Dibene et al. | 165/185 |

FOREIGN PATENT DOCUMENTS

| | | |
|---|---|---|
| GB | 1437 751 | 6/1976 |
| GB | 2 225 192 | 5/1990 |
| GB | 2 249 691 | 5/1992 |
| JP | 121393 | 9/1981 |
| JP | 88535 | 6/1989 |
| JP | 04-340895 | 11/1992 |
| WO | WO 00/76183 | 12/2000 |

* cited by examiner

*Primary Examiner*—David Martin
*Assistant Examiner*—Thanh S. Phan
(74) *Attorney, Agent, or Firm*—Scully, Scott, Murphy & Presser

(57) ABSTRACT

Upper casing and lower casing of a portable telephone body enclose a body inner cavity in which a printed circuit board is disposed. The printed circuit board has an upper surface thereof on which a speaker body is fixedly mounted by means of soldering. A head portion of the speaker body is fitted with a cap in which a net is secured. An elastic rib formed in the upper portion of the cap and having a triangular cross section is pressed against the upper casing to thereby block entrance of any moisture and dust through a sound aperture without necessity of any adhesive and double-faced adhesive tape. The blocking of entrance of moisture and dust by the utilization of deformation of an elastic material may be applied to electronic parts other than the acoustic parts.

4 Claims, 4 Drawing Sheets

MOUNTING STRUCTURE OF ELECTRONIC PARTS

BACKGROUND OF THE INVENTION

1. Field of the Invention

The present invention relates to a mounting structure of electronic parts for mounting various electronic parts including acoustic parts such as speakers and others on a casing, and more particularly, relates to a mounting structure of electronic parts, which is suitable for mounting small information devices such as portable telephones.

2. Description of the Related Art

With developments in communication networks, use of information devices represented by portable telephones has been increasing. Most of the information devices employ acoustic parts for sound input and output to be used for making call and other various purposes. The typical examples of the acoustic parts are speakers and microphones. These acoustic parts are usually assembled in the interior of information devices. In such case, the casing of the information device is formed with at least an aperture for permitting sound to be transmitted between the assembled acoustic parts and the outside of the casing. The aperture permits not only the sound to pass therethrough but moisture, dust and other various foreign materials to enter the interior of the information device. These moisture and dust often become the cause for deteriorating the quality of the acoustic parts. Further, electronic parts operative to perform optical indications such as displays must suffer from such a problem that quality of the electric parts is degraded due to attachment of dust thereto. Thus, it is quite usual that a membrane-like member for protection from moisture and dust is disposed between the electronic parts such as acoustic parts that are accommodated in the interior of the information device and the aperture formed in the device casing.

FIG. 1 is a partial cross-sectional view illustrating an example of a mounting structure of electronic parts in a portable telephone, which is an example of the information device. Upper casing 11A and lower casing 11B which constitute the body of a portable telephone encloses inner cavity 12 of the body, in which printed circuit board 13 is disposed. On this printed circuit board 13 is mounted speaker body 14 as an acoustic part by the use of SMT, i.e., surface mount technology. Namely, terminals 15A and 15B made of a thin metallic sheet project from both side portions of speaker body 14 in the shape of an approximate cylinder. These terminals have one end curved in a L-shape, respectively, which is fixed to the surface of printed circuit board 13 by means of solder 16.

Upper casing 11A is bored with sound aperture 17 at a position opposing an upper middle of speaker body 14. Between speaker body 14 and upper casing 11A are mounted ring-like packing 18 made of urethane foam material and effectively discharging sound through sound aperture 17 without discharging it into the interior of the casing, and dust-proof net 19. Onto the upper surface of packing 18 is bonded first double-faced adhesive tape 21 in the shape of a ring identical with that of the packing in such a manner that the upper surface of the tape is bonded to upper casing 11A. Second double-faced adhesive tape 22 in the shape of a similar ring is attached to dust-proof net 19 of which the lower surface is bonded to the upper surface of speaker body 14.

Upon assembling these parts, an assembling operation is needed to attach dust-proof net 19 to the upper surface of speaker body 14 that is surface-mounted on printed circuit board 13, by the use of second double-faced adhesive tape 22. Another assembling operation is also needed to attach ring-like packing 18 to a portion around sound aperture 17 of upper casing 11A by the use of first double-faced adhesive tape 21. When these assembling operations are completed, ring-like packing 18 and dust-proof net 19 are fixed by pressure so that all parts are integrated into one piece.

According to the mounting structure of electronic parts, as shown in FIG. 1, the upper surface of speaker body 14 compresses packing 18 by constant pressure to come into tight contact therewith. Therefore, bonding of dust-proof net 19 to speaker body 14 as well as prevention of leakage of any sound can be realized.

Nevertheless, this prior art mounting structure of electronic parts needs to attach double-faced adhesive tapes 21 and 22 to separate parts, and accordingly requires two separate steps of assembling operations to be processed. Further, when packing 18 and dust-proof net 19, which are fixedly mounted in position by the use of double-faced adhesive tapes 21 and 22, respectively, are compressed to come into tight contact with each other, it is needed to adjust the positions of these two parts. This requires an additional works to do. Furthermore, the use of double-faced adhesive tapes 21 and 22 for bonding of the parts to one another needs that the bonded faces of respective parts must be kept clean during the bonding operation, and accordingly a problem that the parts must be adequately controlled during the assembling process occurs.

SUMMARY OF THE INVENTION

Therefore, the object of the present invention is to provide a mounting structure of electronic parts, which is capable of easily mounting electronic parts such as acoustic parts including a speaker and other various parts.

In a first aspect of the present invention, a mounting structure of electronic parts is formed by (i) a casing provided with an aperture through which sound wave is permitted to pass, and (ii) a cylindrical member arranged between the casing and an acoustic part for either input or output of the sound wave, which is fixedly disposed in the interior of the casing at a predetermined position opposing the aperture. The cylindrical member has one end thereof enclosing an end circumferential portion of an aperture opposed side of the acoustic part and is fitted to the end circumferential portion. The other end thereof is in press contact with a surface extending along an entire periphery of the aperture of the casing. The cylindrical member has a length extending from the aperture opposed end of the acoustic part to a casing side extreme end of the above-mentioned other end, being larger than a distance from the end of the acoustic part to a press contact position of the casing, when the above-mentioned one end is kept to be fitted on the acoustic part. And further, at least the other end of the cylindrical member is constituted by material having elasticity and deformed by pressure.

Accordingly when the acoustic part is accommodated in the casing, the other end of the cylindrical member comes in press contact with the periphery of the aperture of the casing. Thus, none of adhesive and double-faced adhesive tape is required.

In a second aspect of the invention, a mounting structure of electronic parts is formed by (i) a casing provided with an aperture through which sound wave is permitted to pass, and (ii) a member formed in a cylindrical shape as a whole and interposed between the casing and an acoustic part fixedly disposed in the interior of the casing at a predetermined position opposing the aperture for either input or output of the sound wave. The cylindrical member is kept in press contact with an entire periphery of the aperture by an opposing surface of the acoustic part, which opposes the aperture side, and a face extending along a periphery of the aperture of the casing. The cylindrical member has an axial length larger than a distance from the opposing surface of the acoustic part to a press-contact position of the casing, and at least portions of the cylindrical member in contact with the above-mentioned opposing surface and the casing being constituted by material that has elasticity and is deformed by pressure.

Thus, under a condition such that the acoustic part is accommodated in the casing, the other end of the cylindrical member comes in press contact with the periphery of the aperture, and therefore none of adhesive and double-faced adhesive tape is required.

Each of the present inventions as described above can further comprise a sheet-like member disposed so as to obstruct the interior of the cylindrical member to thereby prevent entrance of any moisture and dust.

The sheet-like member may be a net-like member having minute openings therein. The disposition of this sheet-like member can prevent moisture and dust from entering the acoustic part through the aperture.

In further aspect of the invention, the mounting structure of electronic parts is provided with a closing member deformed by pressure and blocking between the electronic parts disposed in the interior of the casing and the other parts in the interior of the casing.

Namely, the electronic parts disposed in the interior of the casing can be protected by the closing member that is deformed by pressure from the dust left in the interior of the casing.

The above objects, features and advantages of the present invention will become apparent from the following description based on the accompanying drawings, which illustrate an example of a preferred embodiment of the present invention.

DETAILED DESCRIPTION OF THE PREFERRED EMBODIMENTS

Description for explaining the present invention will be provided hereinbelow with reference to the preferred embodiments.

Figure 1:
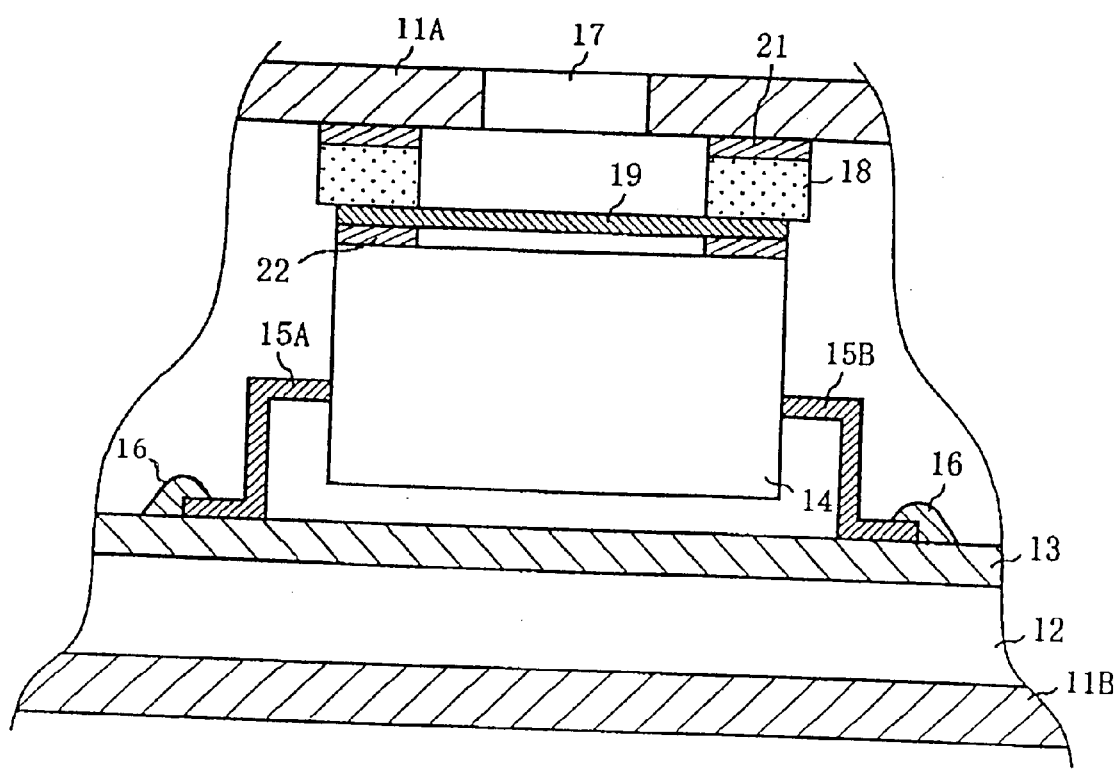
FIG. 1 is a cross-sectional view of a principal portion of a portable telephone, representing an example of a mounting structure of electronic parts, according to the prior art.
Figure 2:
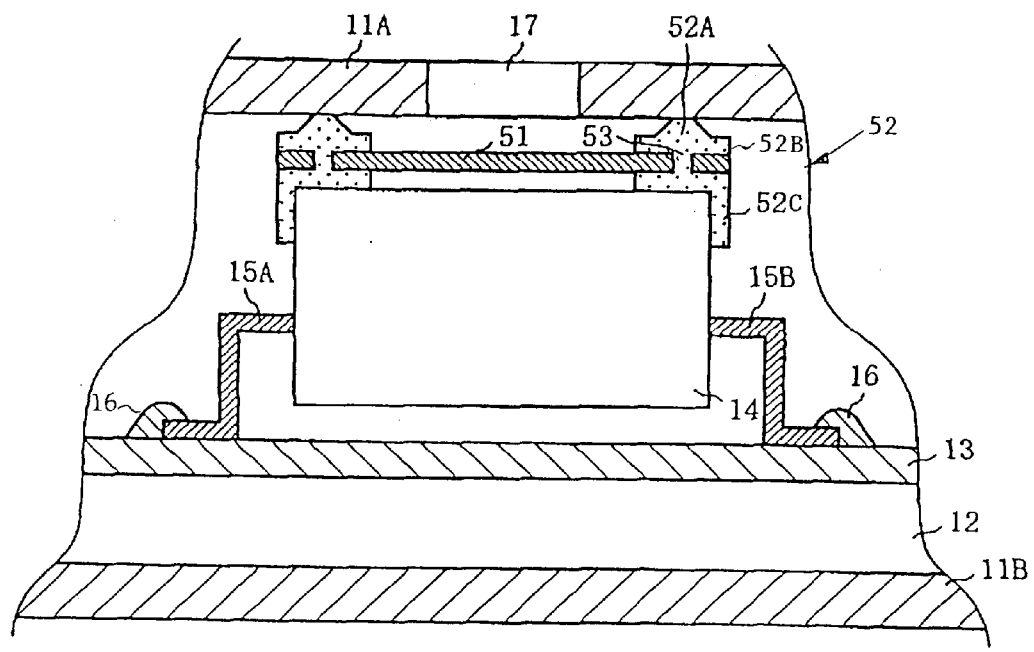
FIG. 2 is a cross-sectional view of a principal portion of a portable telephone, representing a mounting structure of electronic parts, according to an embodiment of the present invention.

FIG. 2 illustrates a mounting structure of electronic parts, according to an embodiment of the present invention, and members identical with those shown in FIG. 1 are designated by the same reference numerals. In the present embodiment, upper and lower casings 11A and 11B constituting the body of a portable telephone again encloses a body inner cavity 12 in which a printed circuit board 13 is disposed. On this printed circuit board 13 is mounted a speaker body 14 as an acoustic part by the use of the SFT (surface mount technology). Namely, from both sides of speaker body 14 in the shape of an approximately cylinder project terminals 15A and 15B made of thin metallic sheet. The ends of these terminals are bent in a L-shape, respectively, and are fixed to the surface of printed circuit board 13 by means of solder 16.

Upper casing 11A is bored with sound aperture 17 at a position opposing to an upper middle position of speaker body 14. A cap 52 to which a net 51 is fixed is fitted on an upper portion of speaker body 14. In the upper portion of cap 52 is circularly disposed rib 52A, which has a triangular cross section and is structured to be abutted against upper casing 11A.

Figure 3:
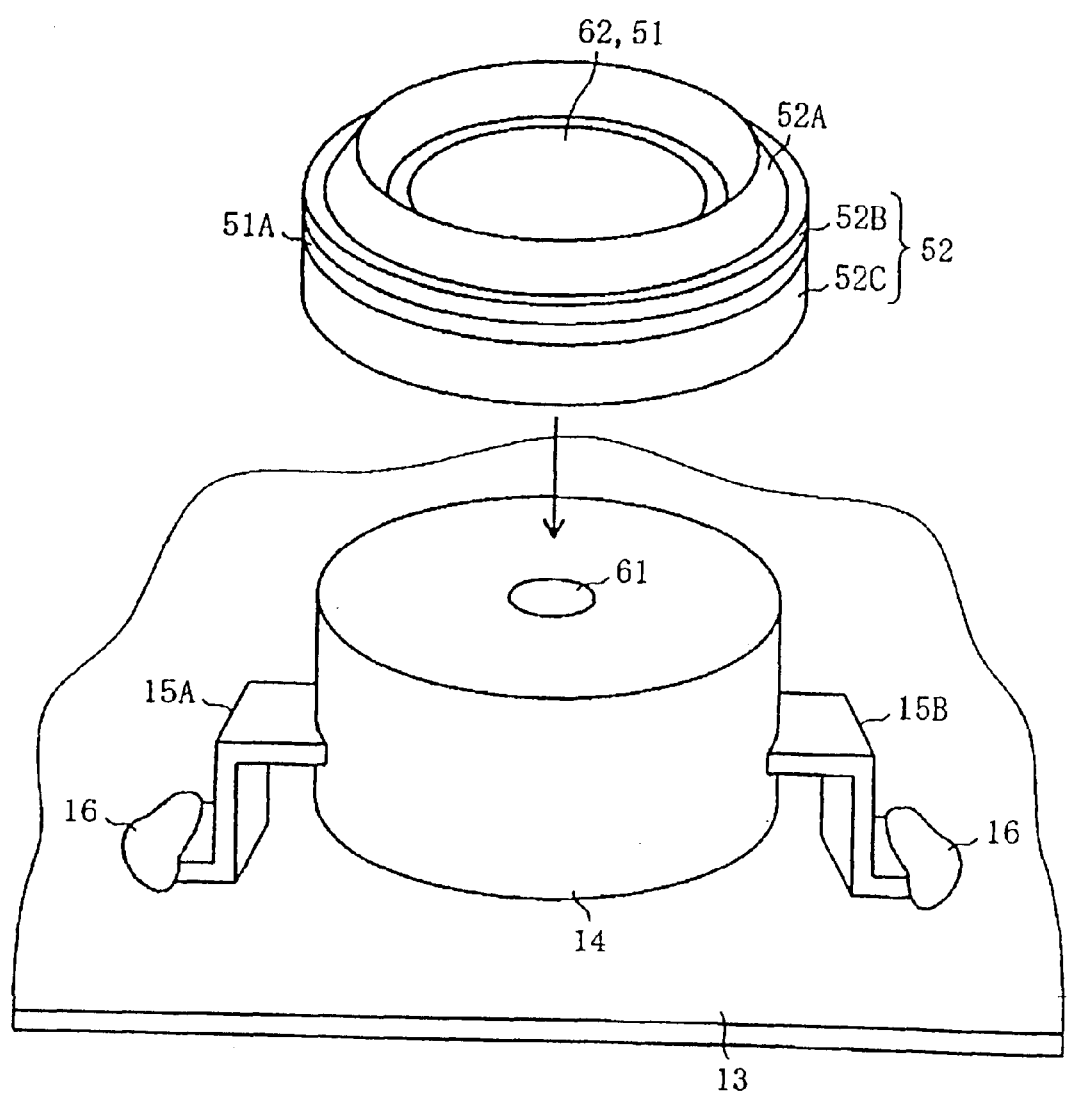
FIG. 3 is a perspective view of the mounting structure of electronic parts, according to the embodiment of FIG. 2, representing a state in which a cap is mounted on a speaker surface-mounted on a printed circuit board.

FIG. 3 illustrates a state in which the cap is attached to the speaker mounted on the printed circuit board. As clearly shown, terminals 15A and 15B made of a thin metallic sheet and projecting from the outer circumference of speaker body 14 in the opposite direction to each other are fixed to printed circuit board 13 by means of solder 16. These terminals 15A and 15B made of a thin metallic sheet are electrically connected to a non-illustrated circuit for outputting a sound signal, on printed circuit board 13.

Speaker body 14 is formed, at its upper middle position, sound port 61 through which sound is discharged toward the outside. Cap 52 is constituted by cap upper half 52B having rib 52A disposed at its upper end portion, and cap lower half 52C to be press-fitted in an outer circumferential portion of speaker body 14. Cap 52 is formed as a bored cap member having, at its center, aperture 62 which is covered by net 51 cut in a circular plate and attached to the inside of aperture 62. A ring-like peripheral portion of net 51 is fixedly arranged between cap upper half 52B and cap lower half 52C. As can be understood from FIG. 2, rib 52A, cap upper half 52B and cap lower half 52C are formed as one integral part, and are made of elastomer showing a high elasticity at room temperature. The elastomer has excellent functions such as shock-absorbability, high rebound elasticity, high coefficient of friction, vibration suppression faculty and sealing function. Instead of the elastomer, silicone rubber may be employed.

In the described mounting structure of electronic parts, a method of integrally fixing net 51 to cap 52 will be firstly described. Net 51 is a thin sheet-like member and has a function for preventing any dust and dirt from entering speaker body 14 or body inner cavity in the casing from the outside. This type of thin sheet-like member must prevent entrance of any dust, dirt and moisture from the outside. Also, the sheet-like member must limit attenuation of sound pressure to the minimum. To this end, in the present embodiment, net 51 is made of either a woven fabric material or a porous material having minute openings therein.

On the other hand, net 51 is formed therein with arbitrary size and number of holes 53. Since cap 52 is formed by the employment of a non-illustrated metallic mould, net 51 must be disposed in the metallic mould so that it is accommodated at a predetermined position in relation to cap 52. Therefore, net 51 is initially cut in a size somewhat larger than that shown in FIGS. 2 or 3, and is set in a predetermined position of the metallic mould. Then, when material for forming cap 52 is poured into the metallic mould, rib 52A, cap upper half 52B and cap lower half 52C are formed to become integral with one another via holes 53. After the molding of cap 52, any extra portion of net 51 projecting from the outer circumference of the cap is removed by cutting to obtain the size and shape as shown in FIGS. 2 or 3.

Cap 52 formed by the above-described method has a portion to be fitted onto the outer circumferential portion of speaker body 14, and this fitted portion of cap 52 has a diameter slightly smaller than the diameter of the outer circumferential portion of speaker body 14. Therefore, when cap 52 having elasticity is press-fitted on the outer circumferential portion of speaker body 14, it can be surely secured to the speaker.

Speaker body 14 onto which cap 52 is fixed is surface-mounted on printed circuit board 13 through the soldering of the thin metallic plate-made terminals 15A and 15B to the board 13. This printed circuit board 13 is then fixed in position in the interior of casing 11 by means of fixing means such as non-illustrated screws or the like. Rib 52A of the cap is designed to have a shape and a height such that the rib is deformed by pressure generated when printed circuit board 13 is pressed against upper casing 11A during fixing of printed circuit board 13 in casing 11, until it is brought into tight contact with upper casing 11A. Therefore, if a position where speaker body 14 is surface-mounted on printed circuit board 13 were preliminarily determined in relation to the position of sound aperture 17, a very simple assembling operation for fixing printed circuit board 13 to a predetermined position within the casing allows annular rib 52A of the cap to come in press-contact with upper casing 11A. Hereby, the sound generating from speaker body 14 can be effectively output through sound aperture 17 without leaking into the interior of the casing. Also, a portion formed by cap upper half 52B of this cap and net 51 adequately prevents dust, dirt or moisture from entering not only the interior of speaker body but also the interior of the device per se, via the portion.

Furthermore, according to the present embodiment, since the number of the constituent parts can be reduced, it is possible to narrow spacing between the upper surface of the speaker and the casing to thereby result in contribution to a reduction in the entire size or thickness of an information device such as a portable telephone and so on.

Modification of the Embodiment

Figure 4:
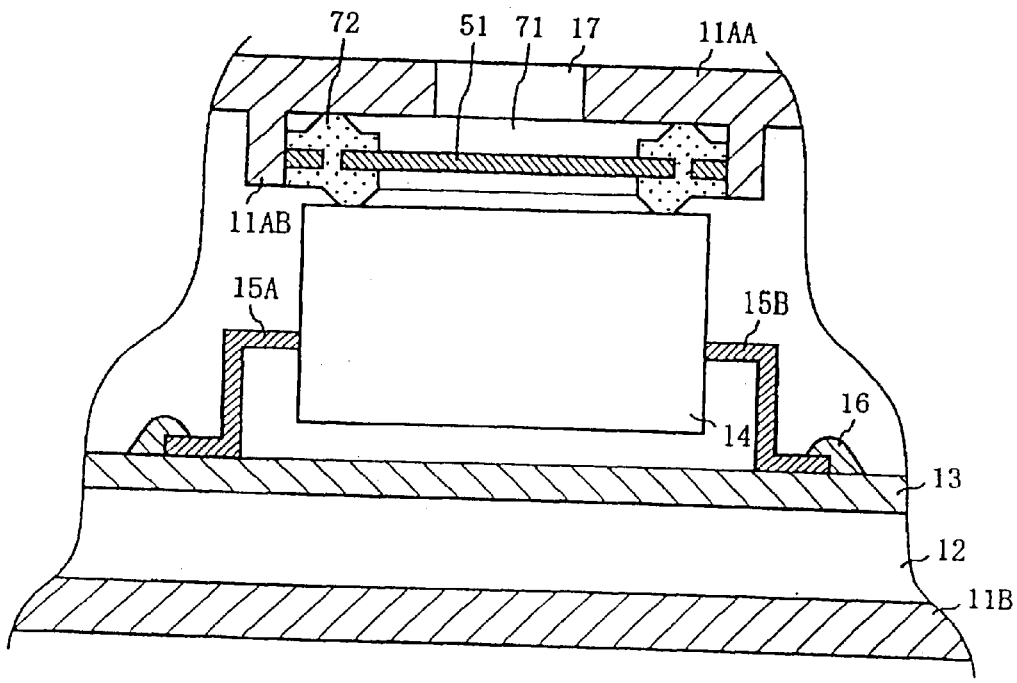
FIG. 4 is a cross-sectional view of a principal portion of a portable telephone, representing a mounting structure of electronic parts, according to a modified embodiment of the present invention; and, FIG. 5 is an enlarged cross-sectional view representing a portion of a cap together with its surrounding in the modified embodiment of FIG. 4.

FIG. 4 illustrates a mounting structure of electronic parts, according to a modification from the embodiment of the present invention. It should be understood that, in this figure, the same parts as those of FIG. 2 are designated by the same reference numerals, and the description thereof will be omitted for the brevity sake.

In the modification, ring-like rib 11AB having an inner diameter equal to an outer diameter of circular net 51 is arranged in a undersurface of upper casing 11AA so as to downwardly project wherefrom. Thus, in a cylindrical cavity 71 enclosed by rib 11AB, entirely ring-like cap 72 together with integral net 51 is accommodated.

Figure 5:
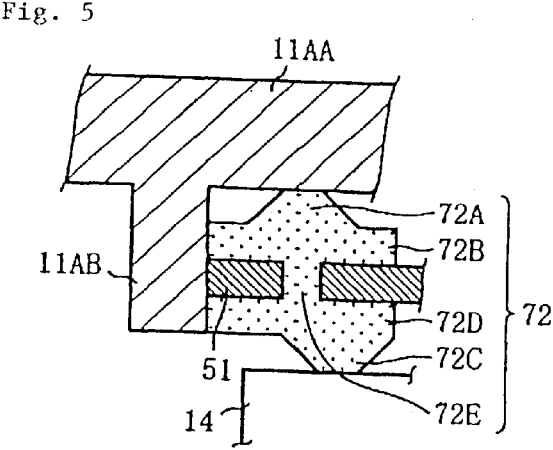

FIG. 5 illustrates by enlarged scale a portion of cap 72 along with its surrounding. Cap 72 is made of either elastomer or silicone rubber, and is constituted by cap upper half 72B provided, on its upper portion, with first rib 72A having a triangular cross section, and cap lower half 72D provided, on its lower portion, with second rib 72C having a triangular cross section. Cap upper half 72B and cap lower half 72D are connected together by connecting portion 72E, so as to form integral cap 72 as a whole. Connecting portion 72E is formed by elastomer or silicone rubber that is filled in the holes bored in net 51.

In this modification, the diameters of cap upper half 72B and cap lower half 72D are slightly larger than the inner diameter of rib 11AB. Accordingly, cap 72 integral with net 51 can be fixedly arranged when these two halves 72B and 72D are press-fitted in the inner face of rib 11AB. Also, the height of cap 72 under such a condition that no pressure in the direction of the height (in a vertical direction) is applied thereto is made so as to be larger by a predetermined amount than a distance from the undersurface of upper casing 11AA to the position of the upper surface of speaker body 14 at the time of mounting thereof. Therefore, under a condition that cap 72 is inserted in the inner face of rib 11AB, when printed circuit board 13 mounting thereon speaker body 14 is fixed to a predetermined position within the interior of the casing, first rib 72A is in press-contact with the undersurface of upper casing 11AA and is resultantly deformed to thereby be in tight contact with that undersurface. Further, second rib 72C comes in press-contact with the upper surface of speaker body 14 so as to be deformed while being in tight contact therewith.

AS a result, the sound generating from speaker body 14 can be effectively output through sound aperture 17 without leaking into the interior of the casing. Further, a portion formed by cap upper half 72B of the cap and net 51 prevents entrance of dust, dirt or moisture into not only the interior of the speaker but also the interior of the device from the outside via this portion.

Furthermore, according to the described modification, the number of constituent parts can be reduced so as to narrow space between the upper surface of the speaker and the casing, and accordingly contribution to a reduction in the entire size or the thickness of an information device such as a portable telephone and so on can be ensured.

It should be appreciated that in the described embodiments, although the speaker is taken as an example of an acoustic device, the present invention will be equally applied to a microphone.

Further, in the described embodiments, a consideration was paid to the protection of electronic parts from the entrance of either moisture or dust and dirt from the outside of the casing. However, the technique of deforming the elastic member or members by pressure to come in tight contact with a predetermined member will allow the electronic parts to be surely protected against entrance of dust and moisture from the interior of the casing.

It will be understood from the foregoing description that in accordance with the inventions as claimed in claims 1 through 4, since the electronic parts within a casing are protected against entrance of moisture or dust and dirt by the employment of a material capable of deforming by pressure, use of any adhesive and double-faced adhesive tape for that purpose is not needed or can be restricted to a given purpose only. Therefore, a positive employment of materials such as silicone, which is unsuitable to the adhesive and the double-faced adhesive tape, can be realized resulting in enlarging the freedom of choice of materials. Furthermore, since more adequate materials can be used, the quality of products in which electronic parts are accommodated can be improved.

Although certain preferred embodiments of the present invention have been shown and described in detail, it should be understood that various changes and modifications may be made therein without departing from the scope of the appended claims.

What is claimed is:

1. A mounting structure of electronic parts, comprising:
a casing provided with an aperture through which sound wave is permitted to pass; and
a cylindrical member fitted on an acoustic part fixedly disposed in the interior of said casing at a predetermined position opposing said aperture for either input or output of the sound wave,
wherein said cylindrical member has one end thereof enclosing an end circumferential portion of an aperture opposed side of said acoustic part and being fitted to the end circumferential portion and the other end thereof being in press contact with a surface extending along an entire periphery of the aperture of said casing; the length of said cylindrical member extending from the aperture opposed end of said acoustic part to a casing side extreme end of said other end is larger than a distance from the end of the acoustic part to the press-contact face by said casing when said one end of said cylindrical member is fitted on the acoustic part, and at least said other end of the cylindrical member being constituted by material that has elasticity and is deformed by pressure.

2. The mounting structure of electronic parts, according to claim 1, further comprising a sheet-like member disposed so as to obstruct the interior of said cylindrical member to thereby prevent entrance of any moisture and dust.

3. A mounting structure of electronic parts, comprising:
a casing provided with an aperture through which sound wave is permitted to pass; and,
a cylindrical member formed in a cylindrical shape as a whole and interposed between said casing and an acoustic part fixedly disposed in the interior of said casing at a predetermined position opposing said aperture for either input or output of the sound wave, wherein said cylindrical member is kept in press contact with an entire periphery of said aperture between an opposing surface of the acoustic part which opposes said aperture side and a face extending along a periphery of said aperture of said casing, said cylindrical member having an axial length of itself larger than a distance from said opposing surface of said acoustic part to a press-contact position of said casing, and at least portions of said cylindrical member in contact with said opposing surface and said casing being constituted by material that has elasticity and is deformed by pressure.

4. The mounting structure of electronic parts, according to claim 2, further comprising a sheet-like member disposed so as to obstruct the interior of said cylindrical member to thereby prevent entrance of any moisture and dust.

* * * * *